United States Patent [19]

Ambur et al.

[11] Patent Number: 5,255,145
[45] Date of Patent: Oct. 19, 1993

[54] SHUTTER SPRING STOP FOR DISK CARTRIDGES

[75] Inventors: Gregg A. Ambur, Wahpeton, N. Dak.; David L. Hubbling, Breckenridge, Minn.

[73] Assignee: Minnesota Mining and Manufacturing Company, St. Paul, Minn.

[21] Appl. No.: 770,020

[22] Filed: Sep. 30, 1991

[51] Int. Cl.⁵ .............................................. G11B 23/03
[52] U.S. Cl. ..................................................... 360/133
[58] Field of Search ........................................ 360/133

[56] References Cited

U.S. PATENT DOCUMENTS

| | | | |
|---|---|---|---|
| 4,497,009 | 1/1985 | Oishi et al. | 360/133 |
| 4,550,354 | 10/1985 | Wakabayashi et al. | 360/133 |
| 4,780,784 | 10/1988 | Covington et al. | 360/133 |
| 4,785,369 | 11/1988 | Ommori et al. | 360/133 |
| 4,807,079 | 2/1989 | Takahashi | 360/133 |
| 4,811,151 | 3/1989 | Kanazawa et al. | 360/133 |
| 4,839,953 | 6/1989 | Mizuta | 29/225 |
| 4,851,948 | 7/1989 | Kato et al. | 360/133 |
| 4,853,817 | 8/1989 | Mizuta et al. | 360/133 |
| 4,918,559 | 4/1990 | Maruyama et al. | 360/133 |
| 4,935,884 | 6/1990 | Muehlhausen | 360/133 |
| 4,943,880 | 7/1990 | Muehlhausen et al. | 360/133 |
| 5,021,913 | 6/1991 | Overland et al. | 360/133 |
| 5,063,553 | 11/1991 | Takahashi | 360/133 |

FOREIGN PATENT DOCUMENTS 0218231 4/1987 European Pat. Off. .

Primary Examiner—Bruce C. Anderson
Attorney, Agent, or Firm—Gary L. Griswold; Walter N. Kirn; Charles D. Levine

[57] ABSTRACT

A disk cartridge includes a rotatable disk, a cartridge case for housing the disk, and a U-shaped shutter slidably disposed on the front wall of the cartridge case. The cartridge case includes a head access opening formed adjacent the front wall. The access opening is opened and closed by the shutter which is biased closed by a spring. A projection mounted on the shutter contacts and locates the spring between one of the cartridge case side walls and the projection.

10 Claims, 2 Drawing Sheets

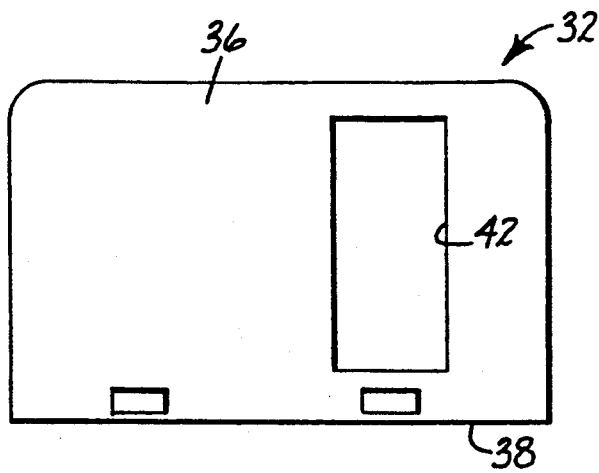
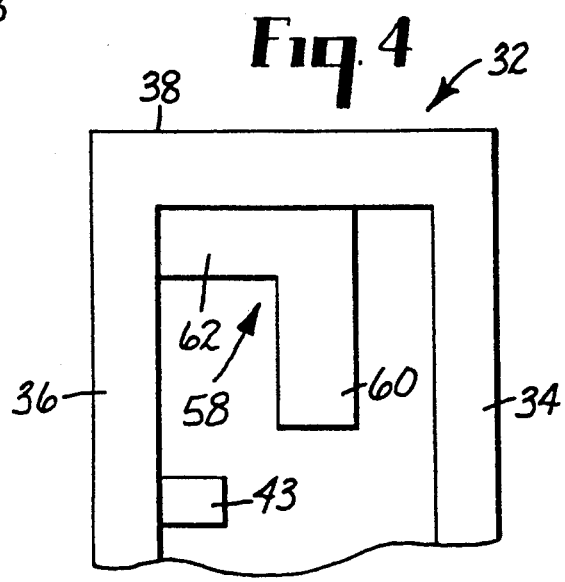
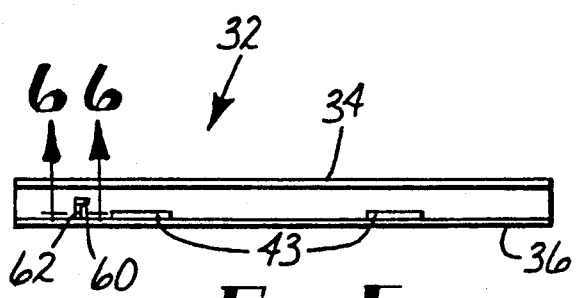
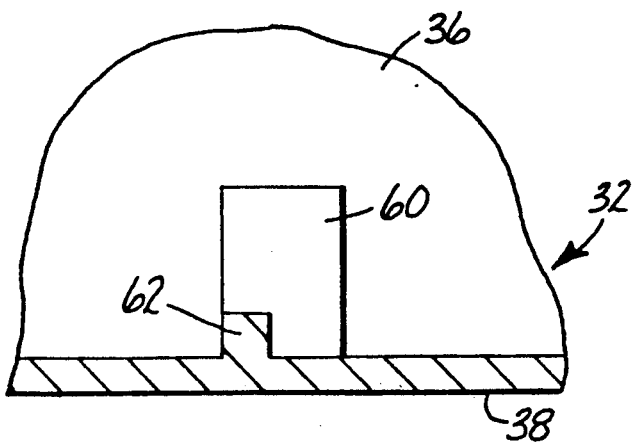

SHUTTER SPRING STOP FOR DISK CARTRIDGES

TECHNICAL FIELD

The present invention relates to rigid disk cartridges. More particularly, the present invention relates to shutter spring stops for magnetic or optical diskette cartridges.

BACKGROUND OF THE INVENTION

Rigid recording disk cartridges having a circular, floppy, magnetic or optical disk rotatably mounted within a disk cartridge case are well known. The cartridge is mountable in a disk drive apparatus to rotate and access the recording disk by a magnetic or optical recording head for recording or reproducing information. The disk cartridge includes a rotatable magnetic or optical disk, a cartridge case for housing the disk having a central axis and a front wall, and a U-shaped shutter slidably disposed on the front wall of the case.

Upper and lower walls mate to form the outer dimensions of the cartridge case. A drive shaft opening is formed through a central portion of the lower wall to receive a drive shaft to rotate the magnetic disk within the cartridge case. A head access opening is formed in the upper and lower walls between the central axis and the front wall to access the magnetic disk. The head access opening is opened and closed by the shutter which slides between open and closed positions. A spring biases the shutter in the closed position to cover and close the head access opening. The spring is connected to the shutter with a shutter spring hook formed on the shutter. When the cartridge is inserted into the disk drive, the shutter is moved to the open position by the disk drive to provide access to the disk. The shutter may also include one or more tabs which ride in a slot in the wall of the cartridge to guide the shutter.

U.S. Pat. Nos. 4,853,817 to Mizuta et al., 4,851,948 to Kato et al., 4,839,953 to Mizuta, and 4,785,369 to Omori et al. are examples of magnetic disk cartridges in which the shutter spring is connected to the shutter with a shutter spring hook formed on the shutter. This hook is shown, for example in FIG. 3 of the '817 patent, FIG. 4 of the '953 patent, FIGS. 9 and 18 of the '948 patent, and FIGS. 1–4 of the '369 patent. Typically, these hooks are mounted on the base of the U-shaped shutter and are formed in a relatively complex molding operation. This operation requires that an additional opening or window be formed in one of the arms of the U as a slide is inserted into the mold to form the rounded or upturned undercut portion of the hook. This increases the mold costs and mold maintenance costs, and decreases the aesthetics of the shutter. Overland et al., U.S. Pat. No. 5,021,913 discloses a shutter made by stamping or punching metal which also uses a shutter hook. As shown in FIG. 5, this hook requires an opening be formed in the base of the shutter. The openings made to accommodate the shutter hook in these patents detracts from the aesthetic appearance of the shutter. Moreover, during assembly, the spring can miss and slide around the hook or pop out of the window adjacent the hook.

The '913 patent also discloses a shutter hook which extends outwardly from the shutter both during manufacture and when the shutter is assembled onto the cartridge. This shutter is used with an elongate compression spring as shown in FIG. 10.

Furthermore, systems for molding these shutters require four shutoffs on the slide action of the mold. One forms the large shutter window, another forms the shutter groove tab, a third forms the second shutter groove tab, and the fourth forms the spring hook. Additionally, standard yield at the spring station with the spring hook design is only approximately 90%.

There is a need for a shutter spring stop which overcomes these problems with known designs.

SUMMARY OF THE INVENTION

The present invention improves on the shutter spring stop devices of known disk cartridges using 3.5 inch microfloppy disk cartridge drives by providing an additional shutter stop. The disk cartridge includes a rotatable magnetic disk, a cartridge case for housing the disk having a central axis and a front wall, and a U-shaped shutter slidably disposed on the front wall of the cartridge case. The U-shaped shutter includes an upper arm, a lower arm, and a base portion which interconnects the upper and lower arms.

A generally rectangular upper wall and a generally rectangular lower wall mate to form the outer dimensions of the cartridge case. A drive shaft opening is formed through a central portion of the lower wall and receives a drive shaft to rotate the disk within the cartridge case. A head access opening is formed in both the upper and lower walls between the central axis and the front wall to provide access to the disk. The head access opening is opened and closed by the shutter which has an opening which registers therewith.

A spring biases the shutter closed. A projection is mounted on the base portion of the shutter and contacts and locates the spring between one of the cartridge case side walls and the projection. The projection is located a perpendicular distance from imperforate portions of the arms of the U. The projection is L-shaped when viewed in a plane parallel to the plane of the arms of the U and is located adjacent one of the arms of the U. The projection is not visible from the outside of the shutter when viewing the shutter from a direction perpendicular to the plane of the arms of the U.

BRIEF DESCRIPTION OF THE DRAWINGS

FIG. 3 is a front view of the shutter used with the disk cartridge of FIG. 1.

FIG. 4 is a partial side view of the shutter of FIG. 3.

FIG. 5 is a bottom view of the shutter of FIG. 3.

FIG. 6 is a cross-sectional view taken along line 6—6 of FIG. 5.

DETAILED DESCRIPTION OF PREFERRED EMBODIMENTS

Figure 1:
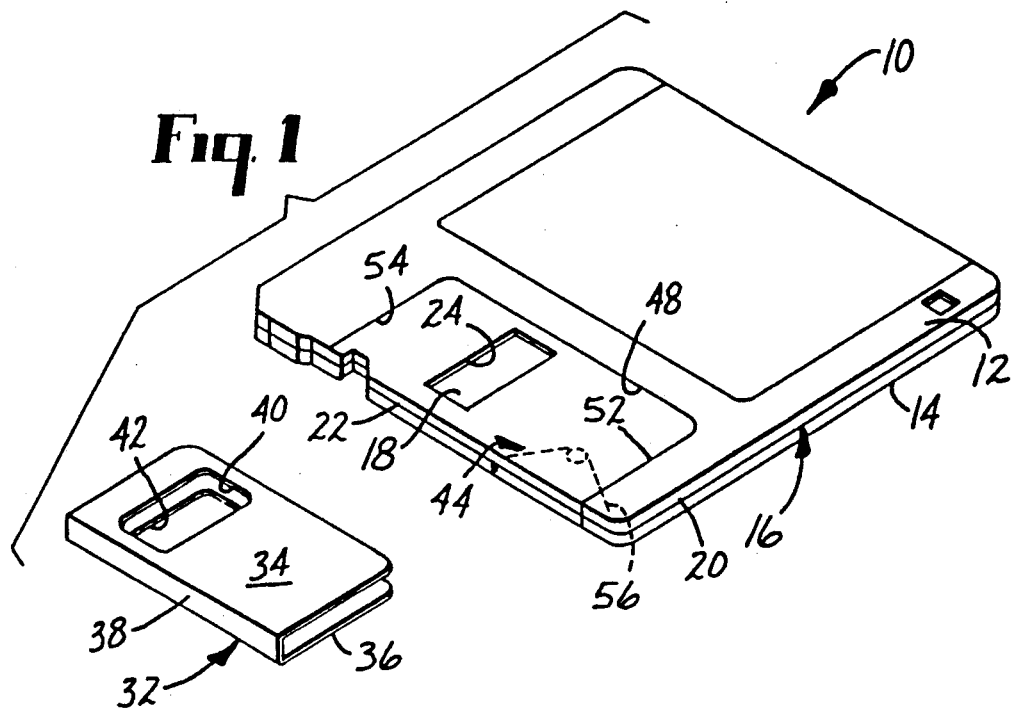
FIG. 1 is a perspective view of a disk cartridge according to the present invention.
Figure 2:
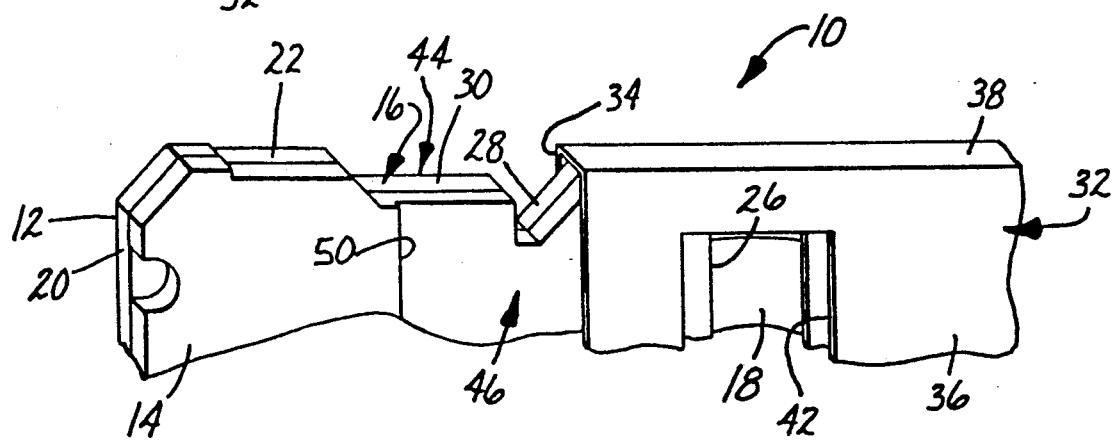
FIG. 2 is a top perspective view of the disk cartridge of FIG. 1 showing the front wall.

A 3¼ inch rigid disk cartridge is illustrated in the figures and described below. Nonetheless, the present invention could also be adapted for use with 5¼ inch disk cartridges, 2 inch disk cartridges, or other size cartridges having shutters. Referring to FIGS. 1 and 2, the cartridge 10 includes an upper case wall 12 and a lower case wall 14 which are substantially identical in shape and mate to form a thin, substantially rectangular case 16. The case 16 is preferably formed of a rigid plastic material such as injection molded ABS resin. A circular floppy disk 18 formed of a magnetizable composition and having a circular central hub typically formed of metal is rotatably mounted within the case 16 between two circular nonwoven pads or wipers (not shown) which serve as shock absorbers and cleaners for the disk 18. Each wiper contacts the disk surfaces to wipe debris from the disk 18 and permit the disk 18 to rotate without interference from the case walls 12, 14.

Peripheral edge walls extend perpendicularly from the upper and lower case walls 12, 14 and form the side walls 20 and the front wall 22 of the case 16, and an interior pocket for the disk 18. The lower case wall 14 has a central opening (not shown) aligned with a central axis of the disk 18 for receiving a drive shaft of a disk drive apparatus (not shown) to rotate the disk 18 within the case 16.

The upper and lower case walls 12, 14 also have elongated, generally rectangular access openings 24, 26 located between the central axis of the case 16 and the front wall 22. The access openings 24, 26 permit a read-write head of the disk drive apparatus to access the disk 18. A groove 28 is provided on the front wall 22 between the access openings 24, 26 and one side of the case 16. When the cartridge 10 is inserted into a disk drive, a shutter actuation pin in the disk drive contacts the front wall 22 in a recess 30 and slides toward the groove 28. This slides a U-shaped shutter 32 until the actuation pin stops in the groove 28 and the access openings 24, 26 are uncovered.

The U-shaped shutter 32 is slidably disposed on the front wall 22 of the cartridge case 16 and is movable between an open and a closed position. The shutter 32 may be metal or plastic and includes an upper arm 34, a lower arm 36, and a base portion 38 which interconnects the upper and lower arms 34, 36. The upper arm 34 has an opening 40 which registers with the upper head access opening 24. The lower arm 36 has an opening 42 which registers with the lower head access opening 26. This permits access to the disk 18 by the read-write head when the shutter 32 is in the open position. The shutter 32 slides over a sliding surface formed by an upper indented portion 44 and a lower indented portion 46. The indented portion 44 is bordered on three sides by a U-shaped edge 48, and the indented portion 46 is bordered on three sides by a U-shaped edge 50. The shutter 32 may also include tabs 43 which ride within grooves (not shown) on the sliding surface.

In the closed position, the left edge of the shutter 32 is disposed against the left arm 52 of the U-shaped edge 48 as shown in FIG. 2. In the open position, the right edge of the shutter 32 is disposed against the right arm 54 of the U-shaped edge 48. The shutter 32 is biased in the closed position by a spring 56. A projection 58 is mounted on the base portion 38 of the shutter 32 and contacts and locates the spring 56 between one of the cartridge case side walls 20 and the projection 58. The projection 58, as shown in FIGS. 4, 5, and 6 is located a perpendicular distance from imperforate portions of the arms 34, 36 of the U. The projection 58 is L-shaped when viewed in a plane parallel to the plane of the arms 34, 36 of the U, as shown in FIGS. 4 and 5, and is located adjacent the lower arm 36 of the U. The projection 58 is not visible from the outside of the shutter 32 when viewing the shutter 32 from a direction perpendicular to the plane of the arms 34, 36 of the U, as shown in FIG. 3, as there is no opening adjacent the projection 58 and the shutter 32 is not transparent. This gives the shutter 32 a very clean and sleek appearance.

The projection 58 includes a first arm 60 which extends perpendicularly from the base portion 38 of the shutter 32. A second arm 62 extends along the base portion 38 between the first arm 60 and the lower arm 36 of the shutter 32.

This shutter stop design can be formed in cartridge cases 16 and shutters 32 by molding, as with known cartridges 10. The projection 58 is formed on the shutter 32 during the molding of the shutter 32 without requiring any moving parts in the mold. No slides or shutoffs are used for the projection. Eliminating the shutoffs for the projection eliminates the window opening which causes failure of the hook design during the assembly of the spring in the cartridge case 16, as discussed below. Additionally, the elimination of the shutoff needed for the projection reduces the number of shutoffs by 25%. This reduces the mold costs by 5%, maintenance costs by 10%, and down time due to maintenance by 15%, thereby reducing the total manufacturing costs of the shutter 32 and therefore the cartridge 10.

During assembly of the spring 56 into the cartridge 10, the spring 56 can not be mispositioned with respect to the projection 58 as the projection 58 can be made sufficiently wide so that the leg of the spring 56 cannot pass around the projection 58. The cartridge case 16 stops the spring 56 from falling downwardly and passing around the bottom of the projection 58, and the arms 34, 36 of the shutter 32 combine with the projection 58 to make it impossible for the spring 56 not to catch the projection 58 during assembly. Small volume assembly runs with the projection 58 design have demonstrated 100% yield at the spring station of the assembly machine, a significant improvement over the failure rate when using the existing spring hook design. As there is no window created in the arms 34, 36 of the shutter 32 during molding of the projection 58 into the shutter 32, the spring 56 can not project out of the shutter 32 during assembly. Thus, unlike known designs which require this window, problems with possible drive failure or shutter jamming open are greatly reduced.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, although magnetic disks have been described, the invention can be used with optical and other media disks as well.

We claim:

1. A U-shaped shutter for use on a substantially flat rigid disk cartridge for housing a rotatable disk, wherein the shutter comprises:
   an upper arm;
   a lower arm;
   a base portion interconnecting the upper and lower arms;
   wherein the shutter is mounted on the front wall of the cartridge to open and close a head access opening, and is slidable between an open position and a closed position by a means for biasing the shutter in the closed position; and
   means for contacting and locating the biasing means between the cartridge and the contacting means, wherein the contacting means is located between the arms of the shutter without extending beyond the sides of the shutter arms, wherein the contacting means comprises a first arm and a second arm, wherein the first arm extends from the base portion of the shutter and the second arm extends along the base portion between the first arm and one of the arms of the shutter, and wherein the first arm extends beyond the second arm in the direction perpendicular to the plane of the shutter base portion, in a direction perpendicular to the plane of the shutter arms, and in a direction parallel to both the planes of the shutter base portion and the shutter arms.

2. The shutter of claim 1 wherein the shutter is made of plastic.

3. The shutter of claim 1 wherein the first and second arms present an L-shaped profile in two perpendicular directions.

4. The shutter of claim 1 wherein in the plane of the shutter arms the second arm has a cross-sectional area less than half of the cross-sectional area of the first arm.

5. The shutter of claim 1 wherein the first and second portions are parallelpipedal.

6. The shutter of claim 1 wherein the second arm extends in a direction perpendicular to the plane of the shutter arms.

7. The shutter of claim 1 wherein the shutter arms adjacent the connecting means are imperforate.

8. A substantially flat rigid disk cartridge for housing a rotatable disk comprising:

a cartridge case for housing the disk and comprising a front wall, side walls, generally rectangular upper and lower walls mating to form the outer dimensions of the cartridge case, and a head access opening formed in at least one of the upper and lower walls adjacent the front wall for providing access to the disk;

a U-shaped shutter having an upper arm, a lower arm, and a base portion interconnecting the upper and lower arms, the shutter being mounted on the cartridge case to open and close the head access opening, wherein the shutter is disposed on the front wall of the cartridge case and is slidable between an open position and a closed position with the upper arm of the U disposed against the upper wall, the lower arm of the U disposed against the lower wall, and the base portion of the U disposed against the front wall;

means for biasing the shutter in the closed position; and means mounted on the shutter for contacting and locating the biasing means between one of the cartridge case side walls and the contacting means wherein the contacting means is located between the arms of the shutter without extending beyond the sides of the shutter arms, wherein the contacting means comprises a first arm and a second arm, wherein the first arm extends from the base portion of the shutter and the second arm extends along the base portion between the first arm and one of the arms of the shutter, and wherein the first arm extends beyond the second arm in the direction perpendicular to the plane of the shutter base portion, in a direction perpendicular to the plane of the shutter arms, and in a direction parallel to both the planes of the shutter base portion and the shutter arms.

9. The disk cartridge of claim 8 wherein the biasing means comprises a spring and during assembly of the spring into the cartridge, the spring can not be mispositioned with respect to the connecting means.

10. The disk cartridge of claim 8 wherein the shutter is made of plastic.

* * * * *

UNITED STATES PATENT AND TRADEMARK OFFICE
CERTIFICATE OF CORRECTION

PATENT NO. : 5,255,145
DATED : October 19, 1993
INVENTOR(S) : Ambur et al.

It is certified that error appears in the above-indentified patent and that said Letters Patent is hereby corrected as shown below:

Col. 5, line 26, "parallelpipedal" should read --parallelepipedal--.

Signed and Sealed this

Thirty-first Day of May, 1994

Attest:

BRUCE LEHMAN

*Attesting Officer*     *Commissioner of Patents and Trademarks*